US010225712B2

United States Patent
Won

(10) Patent No.: US 10,225,712 B2
(45) Date of Patent: Mar. 5, 2019

(54) TETHERING DISTRIBUTION APPARATUS, CONTROL METHOD THEREOF, AND CENTRAL MEDIATOR

(71) Applicant: Samsung Electronics Co., Ltd., Gyeonggi-do (KR)

(72) Inventor: Sung-Joon Won, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 161 days.

(21) Appl. No.: 14/326,120

(22) Filed: Jul. 8, 2014

(65) Prior Publication Data

US 2015/0011179 A1   Jan. 8, 2015

(30) Foreign Application Priority Data

Jul. 8, 2013  (KR) .................. 10-2013-0079770

(51) Int. Cl.
  *H04W 4/80*   (2018.01)
  *H04W 4/00*   (2018.01)
  *H04W 88/04*  (2009.01)
(52) U.S. Cl.
  CPC ............. *H04W 4/80* (2018.02); *H04W 4/008* (2013.01); *H04W 88/04* (2013.01)
(58) Field of Classification Search
  CPC .......................... H04W 24/02; H04L 63/0227
  USPC .................. 455/41.1, 405, 466, 552.1, 41.3; 370/299, 254, 315; 709/204, 224; 726/25, 26, 4; 446/298
  See application file for complete search history.

(56) References Cited

U.S. PATENT DOCUMENTS

| | | | |
|---|---|---|---|
| 6,012,961 A * | 1/2000 | Sharpe, III | A63H 3/28 446/175 |
| 9,049,589 B2 * | 6/2015 | Zalmanovitch | H04W 24/02 |
| 9,439,061 B2 * | 9/2016 | Austin | H04W 8/18 |
| 2006/0176836 A1 * | 8/2006 | Jennings, III | H04L 67/104 370/299 |
| 2010/0195611 A1 | 8/2010 | Allen et al. | |
| 2012/0240197 A1 * | 9/2012 | Tran | H04L 63/1416 726/4 |
| 2013/0028132 A1 * | 1/2013 | Choi | H04L 41/12 370/254 |
| 2013/0107783 A1 * | 5/2013 | Shaw | H04W 4/06 370/312 |
| 2013/0148568 A1 * | 6/2013 | Iimori | H04W 40/02 370/315 |
| 2013/0198374 A1 * | 8/2013 | Zalmanovitch | H04L 43/045 709/224 |
| 2014/0215557 A1 * | 7/2014 | Vishnubhatt | H04L 63/0227 726/3 |

* cited by examiner

*Primary Examiner* — Kiet M Doan
(74) *Attorney, Agent, or Firm* — The Farrell Law Firm, P.C.

(57) ABSTRACT

Methods and apparatus are provided for controlling tethering distribution. At least one leecher to which data is to be tethered is detected. Usage of the data that is to be tethered to the at least one leecher is controlled by adjusting an amount of data that is to be tethered for each of the at least one leecher.

17 Claims, 11 Drawing Sheets

TETHERING DISTRIBUTION APPARATUS, CONTROL METHOD THEREOF, AND CENTRAL MEDIATOR

PRIORITY

This application claims priority under 35 U.S.C. § 119(a) to a Korean patent application filed in the Korean Intellectual Property Office on Jul. 8, 2013 and assigned Serial No. 10-2013-0079770, the entire disclosure of which is incorporated herein by reference.

BACKGROUND OF THE INVENTION

1. Field of the Invention

The present invention relates generally to a mobile device and a control method thereof, and more particularly, to a mobile device having a tethering function, and a control method thereof.

2. Description of the Related Art

A tethering function of a mobile device enables the mobile device to function as a mobile hotspot so that an electronic device connected to the mobile device can use a network communication service such as, for example, the Internet.

However, the tethering function cannot provide other functions. Particularly, when a plurality of electronic devices is tethered to a mobile device, it is difficult to effectively control the plurality of electronic devices.

SUMMARY OF THE INVENTION

The present invention has been made to address at least the above problems and/or disadvantages and to provide at least the advantages described below. Accordingly, an aspect of the present invention provides a technique for adjusting an amount of data that is to be tethered to correspond to each of at least one leecher.

In accordance with an aspect of the present invention, a method is provided for controlling tethering distribution. At least one leecher to which data is to be tethered is detected. Usage of the data that is to be tethered to the at least one leecher is controlled by adjusting an amount of data that is to be tethered for each of the at least one leecher.

In accordance with another aspect of the present invention, a method is provided for controlling tethering distribution at a central mediator. An agreement on giving and taking tethered data to and from a mobile device corresponding to a mobile hotspot, is received from at least one leecher. A request for giving and taking tethered data to and from the at least one leecher, is received from the mobile device. The request is transmitted to the at least one leecher.

In accordance with an additional aspect of the present invention, an apparatus is provided for tethering distribution control. The apparatus includes a controller configured to detect at least one leecher to which data is to be tethered, and to control usage of the data that is to be tethered to the at least one leecher by adjusting an amount of data that is to be tethered for each of the at least one leecher.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION

Figure 1:
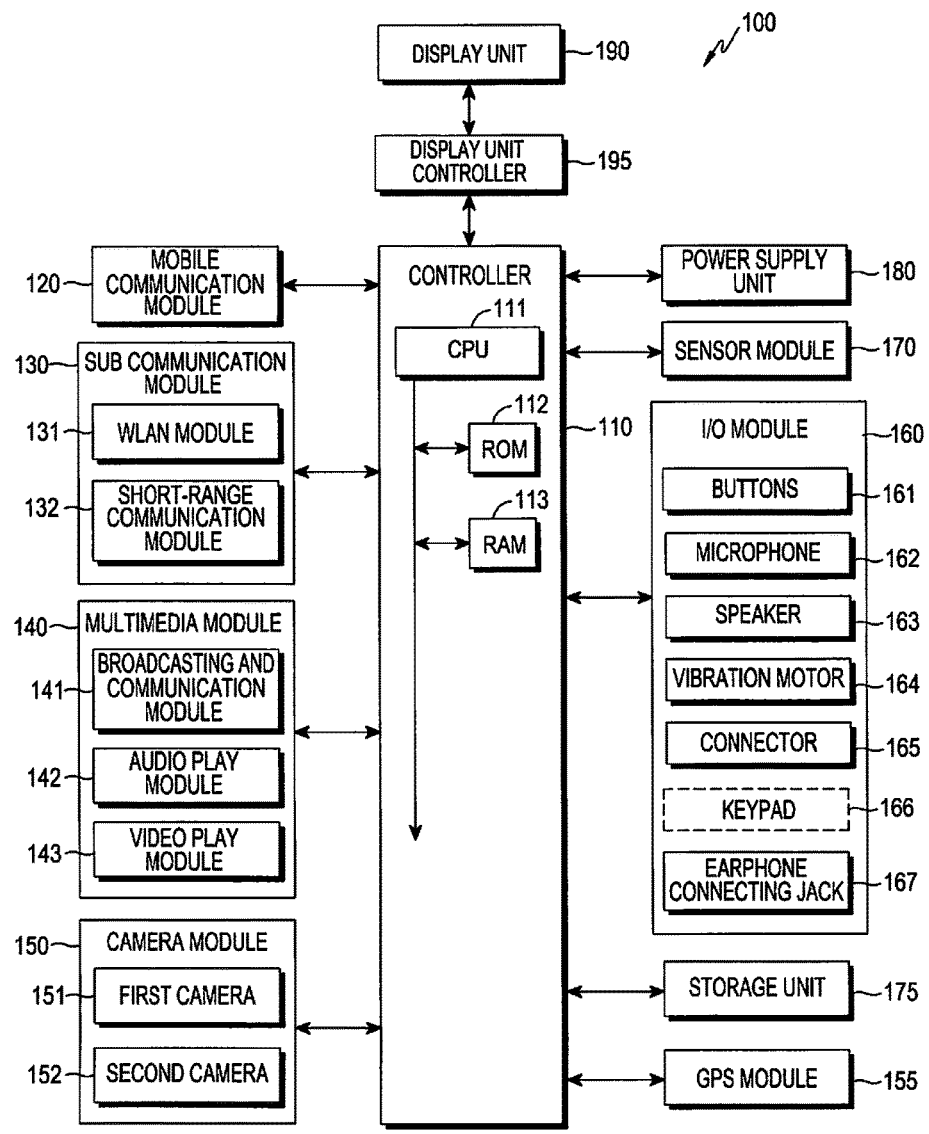
FIG. 1 is a block diagram illustrating a mobile device, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An apparatus, according to an embodiment of the present invention, corresponds to an electronic device, such as a Personal Computer (PC), a mobile device, a tablet PC, or a smart Television (TV). In the following description, the apparatus is assumed to be a mobile device, however, the apparatus is not limited to a mobile device.

FIG. 1 is a block diagram illustrating a mobile device, according to an embodiment of the present invention.

Referring to FIG. 1, a mobile device 100 may be connected to an external device through an external device connector, such as, for example, a sub communication module 130, a connector 165, and an earphone connecting jack 167. The "external device" may be one of various devices that can be connected/disconnected to/from the mobile device 100 in a wired fashion, such as, for example, earphones, an external speaker, a Universal Serial Bus (USB) memory, a charger, a cradle, a docking station, a Digital Multimedia Broadcasting (DMB) antenna, a mobile payment system, a health care system (a blood glucose meter, etc.), a game, or a car navigation system. In addition, the "external device" may include a short-range communication device, such as, for example, a Bluetooth communication device and a Near Field Communication (NFC) device, which can be connected in a wireless fashion to the mobile device 100 through short-range communication, a Wireless Fidelity (WiFi) Direct communication device, and a Wireless Access Point (WAP). Also, the "external device" may include another device, a mobile phone, a smart phone, a table PC, a desktop PC, and a server.

Referring to FIG. 1, the mobile device 100 includes a display unit 190 and a display unit controller 195. Also, the mobile device 100 includes a controller 110, a mobile communication module 120, a sub communication module 130, a multimedia module 140, a camera module 150, a Global Positioning System (GPS) module 155, an input/output module 160, a sensor module 170, a storage unit 175, and a power supply unit 180. The sub communication module 130 includes at least one of a Wireless Local Area Network (WLAN) module 131 and a short-range communication module 132. The multimedia module 140 includes at least one of a broadcasting and communication module 141, an audio play module 142, and a video play module 143. The camera module 150 includes at least one of a first camera 151 and a second camera 152. The input/output module 160 includes at least one of a plurality of buttons 161, a microphone 162, a speaker 163, a vibration motor 164, the connector 165, a keypad 166, and an earphone connecting jack 167. The following description relates to an embodiment in which the display unit 190 and the display controller 195 are a touch screen and a touch screen controller, respectively.

The controller 110 includes a Central Processing Unit (CPU) 111, a Read Only Memory (ROM) 112 that stores control programs for controlling the mobile device 100, and a Random Access Memory (RAM) 113 that stores signals/data received from an external device or tasks being executed by the mobile device 100. The CPU 111 may be a single-core, a dual-core, a triple-core, or a quad-core. The CPU 111, the ROM 112, and the RAM 113 may be connected to each other through internal buses.

The controller 110 may control the mobile communication module 120, the sub communication module 130, the multimedia module 140, the camera module 150, the GPS module 155, the input/output module 160, the sensor module 170, the storage unit 175, the power supply unit 180, the touch screen 190, and the touch screen controller 195.

The mobile communication module 120 enables the mobile device 100 to connect to an external device through mobile communication using at least one antenna under the control of the controller 110. The mobile communication module 120 transmits/receives radio signals for voice calls, video calls, Short Message Service (SMS), or Multimedia Messaging Service (MMS) with a device such as, for example, a mobile phone, a smart phone, a tablet PC, or another device having a phone number input to the mobile device 100, to/from the mobile device 100.

The sub communication module 130 may include at least one of the WLAN module 131 and the short-range communication module 132. For example, the sub communication module 130 may include only the WLAN module 131, only the short-range communication module 132, or both the WLAN module 131 and the short-range communication module 132.

The WLAN module 131 of the sub communication module 130 may connect to the Internet at a place in which a WAP is installed, under the control of the controller 110. The WLAN module 131 supports IEEE802.11x. The short-range communication module 132 of the sub communication module 130 may perform wireless short-range communication between the mobile device 100 and an imaging device under the control of the controller 110. The short-range communication may include Bluetooth, Infrared Data Association (IrDA), WiFi-Direct communication, NFC, etc.

The mobile device 100 may include at least one of the mobile communication module 120, the WLAN module 131, and the short-range communication module 132, according to performance. For example, the mobile device 100 may include a combination of the mobile communication module 120, the WLAN module 131, and the short-range communication module 132, according to performance.

The multimedia module 140 may include the broadcasting and communication module 141, the audio play module 142, or the video play module 143. The broadcasting and communication module 141 of the multimedia module 140 may receive a broadcasting signal (for example, a TeleVision (TV) broadcasting signal, a radio broadcasting signal, or a data broadcasting signal) and additional broadcasting information (e.g., an Electric Program Guide (EPG) or an Electric Service Guide (ESG)) transmitted from a broadcasting station through a broadcasting and communication antenna, under the control of the controller 110. The audio play module 142 may reproduce a digital audio file (e.g., a file having the filename extension of ".mp3", ".wma", ".ogg", or ".wav") that is stored or received under the control of the controller 110. The video play module 143 may reproduce a digital video file (e.g., a file having the filename extension of ".mpeg", ".mpg" ".mp4", ".avi", ".mov", or ".mkv") or a digital audio file that is stored or received under the control of the controller 110.

The multimedia module 140 may also include only the audio play module 142 and the video play module 143. The audio play module 142 and the video play module 143 of the multimedia module 140 may be included in the controller 110.

The camera module 150 may include at least one of the first camera 151 and the second camera 152 for photographing still images or moving images under the control of the controller 110. The camera module 150 may include at least one of the first camera 151 and the second camera 152 for photographing still images or moving images under the control of the controller 110.

The first camera 151 or the second camera 152 of the camera module 150 may include an additional light source, such as a flash, for providing an amount of light required for photographing. The first camera 151 may be disposed in the front part of the mobile device 100, and the second camera 152 may be disposed in the rear part of the mobile device 100. Alternatively, the first and second cameras 151 and 152 may be disposed adjacent to each other to acquire 3D still images or 3D moving images, and a distance between the first and second cameras 151 and 152 may be between 1 cm and 8 cm.

The GPS module 155 may receive radio waves from a plurality of earth-orbiting GPS satellites, and calculate a position of the mobile device 100 using a time of arrival taken for the radio waves from the GPS satellites to arrive at the mobile device 100.

The input/output module 160 may include, as described above, at least one of the plurality of buttons 161, the microphone 162, the speaker 163, the vibration motor 164, the connector 165, and the keypad 166.

The buttons 161 of the input/output module 160 may be provided in the front, side, and/or rear part of the housing of the mobile device 100. The buttons 161 may include at least one of a power/lock button, volume buttons, a menu button, a home button, a back button, and a search button.

The microphone 162 of the input/output module 160 may receive voice or sound under the control of the controller 110 to generate an electrical signal.

The speaker 163 of the input/output module 160 may receive various signals (e.g., a radio signal, a broadcasting signal, a digital audio file, a digital video file, or a photo file) from the mobile communication module 120, the sub communication module 130, the multimedia module 140, or the camera module 150, and output sound corresponding to the various signals to the outside of the mobile device 100, under the control of the controller 110. Also, the speaker 163 may output sound (e.g., button sounds or currency connection sounds) corresponding to a function that is performed by the mobile device 100. The speaker 163 may be provided as at least one unit at an appropriate location on the housing of the mobile device 100.

The vibration motor 164 of the input/output module 160 may convert an electrical signal into mechanical vibration under the control of the controller 110. For example, when the mobile device 100 is in a vibration mode, the vibration motor 164 may operate if a voice call is received from another device. The vibration motor 164 may be provided as at least one unit in the housing of the mobile device 100. The vibration motor 164 may operate in response to a user's touch operation (e.g., touching and/or dragging) with respect to the touch screen 190.

The connector 165 of the input/output module 160 may be used as an interface for connecting the mobile device 100 to an external device or a power source. Data stored in the storage unit 175 of the mobile device 100 may be transmitted to an external device through a wired cable connected to the connector 165 under the control of the controller 110, or data of an external device may be received through the wired cable connected to the connector 165, and stored in the storage unit 175 under the control of the controller 110. The external device may be a docking station, and the data may be an input signal transferred from an external input device, e.g., a mouse or a keyboard. Also, the mobile device 100 may receive power or charge a battery from a power source through the wired cable connected to the connector 165.

The keypad 166 of the input/output module 160 may receive a key input from a user in order to control the mobile device 100. The keypad 166 may include a physical keypad that is provided on the mobile device 100, or a virtual keypad that is displayed on the touch screen 190. The mobile device 100 may include no physical keypad according to a performance or structure of the mobile device 100.

Earphones may be inserted into the earphone connecting jack 167 of the input/output module 160 and connect to the mobile device 100.

The sensor module 170 may include at least one sensor for detecting a status of the mobile device 100. For example, the sensor module 170 may include a proximity sensor for determining whether a user approaches the mobile device 100, and an ambient light sensor for measuring an amount of ambient light around the mobile device 100. Also, the sensor module 170 may include a gyro sensor. The gyro sensor may detect an operation (e.g., rotation, acceleration, or vibration) of the mobile device 100, a point of the compass using the earth's magnetic field, or the direction of gravity. In addition, the sensor module 170 may include an altimeter to measure an atmospheric pressure and detect an altitude. At least one of the above-mentioned sensors may detect a status, generate a signal corresponding to the result of the detection, and transmit the signal to the controller 110. The sensor module 170 may include one or more other sensors or exclude one or more of the above-mentioned sensors according to the performance of the mobile device 100.

The storage unit 175 may store signals or data that is input/output according to operations of the mobile communication module 120, the sub communication module 130, the multimedia module 140, the camera module 150, the GPS module 155, the input/output module 160, the sensor module 170, and the touch screen 190, under the control of the controller 110. The storage unit 175 may store control programs and applications for controlling the mobile device 100 or the controller 110.

In this description, the term "storage unit" includes the storage unit 175, the ROM 112 or RAM 113 included in the controller 110, and a memory card such as, for example, a Secure Digital (SD) card or a memory stick, installed in the mobile device 100. The storage unit 175 may include a non-volatile memory, a volatile memory, a Hard Disk Drive (HDD), or a Solid State Drive (SSD).

The power supply unit 180 may supply power to at least one battery installed in the housing of the mobile device 100, under the control of the controller 110. The battery supplies power to the mobile device 100. Also, the power supply unit 180 may supply power received from an external power source through the wired cable connected to the connector 165 to the mobile device 100. In addition, the power supply unit 180 may supply power received in a wireless fashion from an external power source through a wireless charging technique to the mobile device 100.

The touch screen 190 may provide a user with User Interfaces (UIs) corresponding to various services (for example, a call, data transmission, broadcasting, photography, etc.). The touch screen 190 may transmit an analog signal corresponding to at least one touch operation input to a UI to the touch screen controller 195. The touch screen 190 may receive at least one touch operation by a user's body part (e.g., a finger) or a pointing unit (e.g., a stylus pen). Also, the touch screen 190 is able to sense a touch-and-drag operation, in which case, the touch screen 190 may transfer an analog signal corresponding to a touch trajectory according to the touch-and-drag operation to the touch screen controller 195.

In this description, a touch operation is not limited to a contact between the touch screen 190 and a user's body part or a pointing device, and includes a contactless touch operation. A distance detectable by the touch screen 190 may vary depending on the performance or structure of the mobile device 100.

The touch screen 190 may be a resistive type, a capacitive type, an infrared type, or an acoustic wave type.

The touch screen controller 195 may convert an analog signal received from the touch screen 190 into a digital signal (e.g., X- and Y-coordinates), and transfer the digital signal to the controller 110. The controller 110 may control the touch screen 190 using the digital signal received from the touch screen controller 195. For example, the controller 110 may select or execute a shortcut icon (not shown) displayed on the touch screen 190 in response to a touch operation. Also, the touch screen controller 195 may be included in the controller 110.

Figure 2:
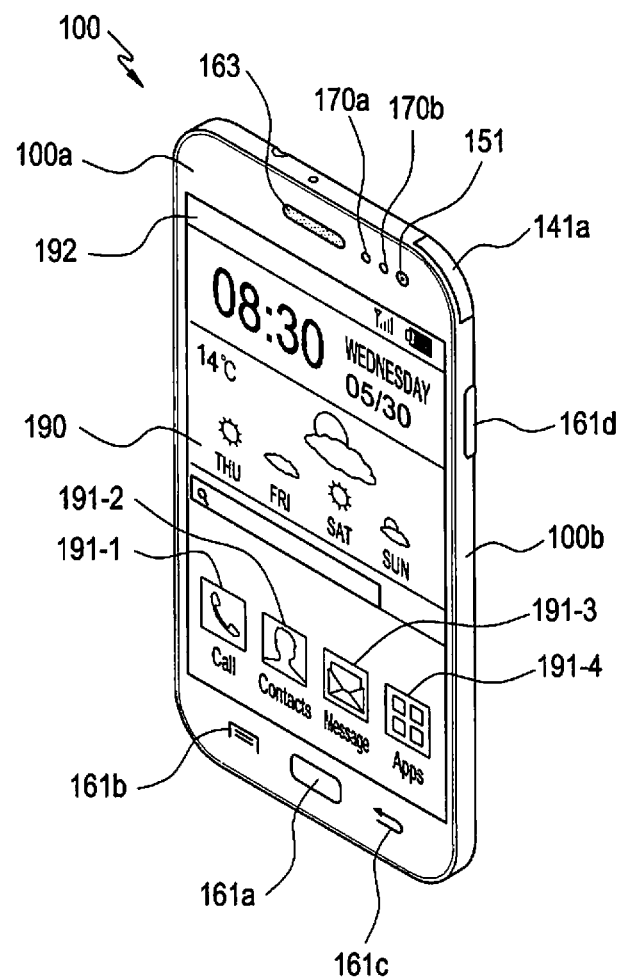
FIG. 2 is a diagram illustrating a perspective view of a front part of a mobile device, according to an embodiment of the present invention.
Figure 3:
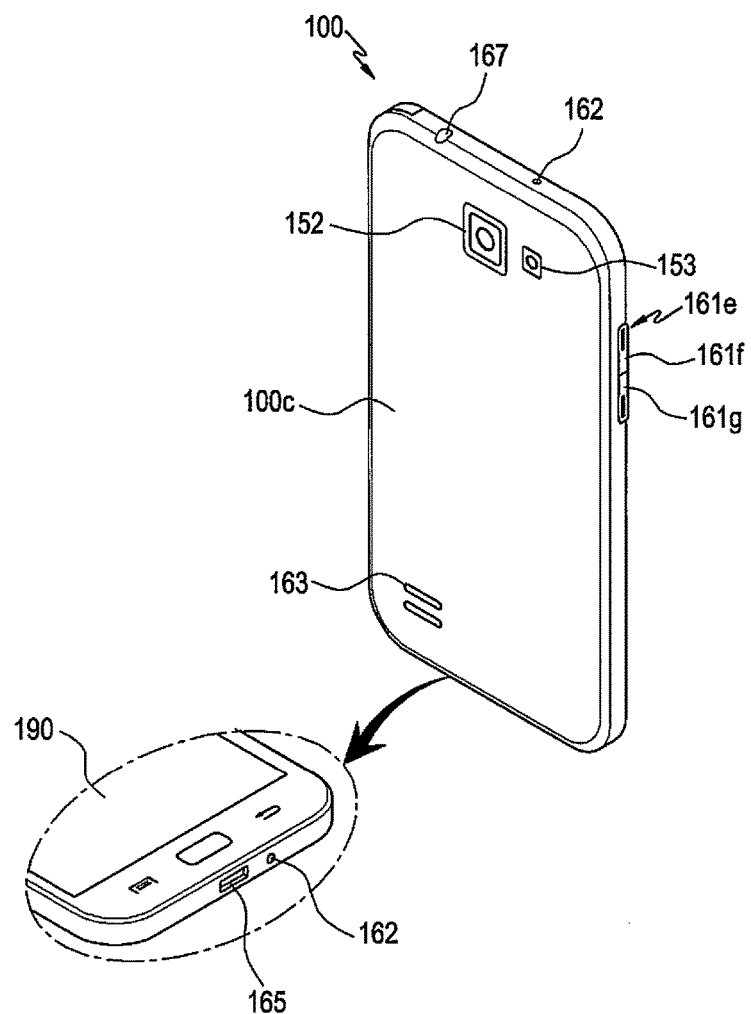
FIG. 3 is a diagram illustrating a perspective view of a rear part of a mobile device, according to an embodiment of the present invention.

FIG. 2 is a diagram illustrating a perspective view of a front part of the mobile device 100, according to an embodiment of the present invention. FIG. 3 is a diagram illustrating a perspective view of a rear part of the mobile device 100, according to an embodiment of the present invention.

Referring to FIGS. 1, 2, and 3, the touch screen 190 may be disposed in a front, center part 100*a* of the mobile device 100. The touch screen 190 may occupy a major area of the front, center part 100*a* of the mobile device 100. FIG. 2 illustrates an example in which a main home screen is displayed on the touch screen 190. The main home screen is a screen that is first displayed on the touch screen 190 when the mobile device 100 powers on. If the mobile device 100 has different home screens in the form of several pages, the main home screen may be the first one of the home screens. On the home screen, shortcut icons 191-1 191-2, and 191-3 for executing applications, an application conversion key 191-4, a clock, weather, and the like, are displayed. The application conversion key 191-4 is used to display application icons representing applications on the touch screen 190. On the upper area of the touch screen 190, a status bar 192 representing the status of the mobile device 100, such as battery level, intensity of reception signals, and current time, is displayed.

Below the touch screen 190, a home button 161*a*, a menu button 161*b*, and a back button 161*c* are provided.

The home button 161*a* is used to display a main home screen on the touch screen 190. For example, if the home button 161*a* is pressed (or touched) when a menu screen or a home screen different from the main home screen is displayed, the main home screen may be displayed on the touch screen 190. Also, if the home button 161*a* is pressed (or touched) while applications are executed on the touch screen 190, the main home screen, as illustrated in FIG. 2, may be displayed on the touch screen 190. The home button 161*a* may also be used to display recently used applications on the touch screen 190 or to display a task manager.

The menu button 161*b* may provide connectivity menus that can be used on the touch screen 190. The connectivity menus may include a widget adding menu, a lock screen changing menu, a search menu, an edit menu, and an environment setting menu. Also, when an application is executed, the menu button 161*b* may provide connectivity menus connected to the application.

The back button 161*c* may be used to display a screen displayed just before a current screen or to quit a most recently used application.

The first camera 151, an ambient light sensor 170*a*, and a proximity sensor 170*b* are disposed on one edge of the front part 100*a* of the mobile device 100. The second camera 152, a flash 153, and the speaker 163 are disposed on a back part 100*c* of the mobile device 100.

A power/reset button 161*d*, volume buttons 161*e* (volume up 161 f and volume down 161*g*), a terrestrial DMB antenna 141*a* for receiving broadcasting, and one or more microphones 162, and the like, are disposed on a side 100*b* of the mobile device 100. The terrestrial DMB antenna 141*a* may be fixedly or removably attached to the mobile device 100.

The connector 165 is formed in the lower side of the mobile device 100. The connector 165 may include a plurality of electrodes, and may be connected to an external device in a wired fashion. The earphone connecting jack 167 is formed in the upper side of the mobile device 100. Earphones are insertable into the earphone connecting jack 167.

Figure 4:
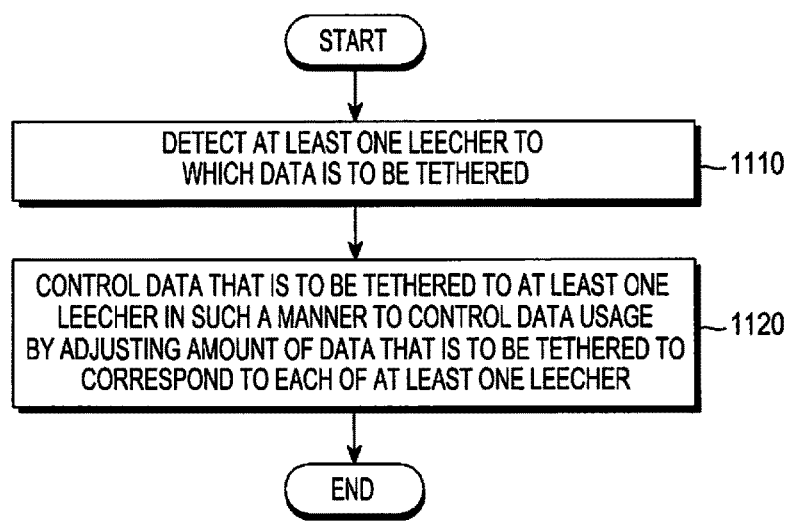
FIG. 4 is a flowchart illustrating a tethering distribution control method, according to an embodiment of the present invention.
Figures 5A, 5B:
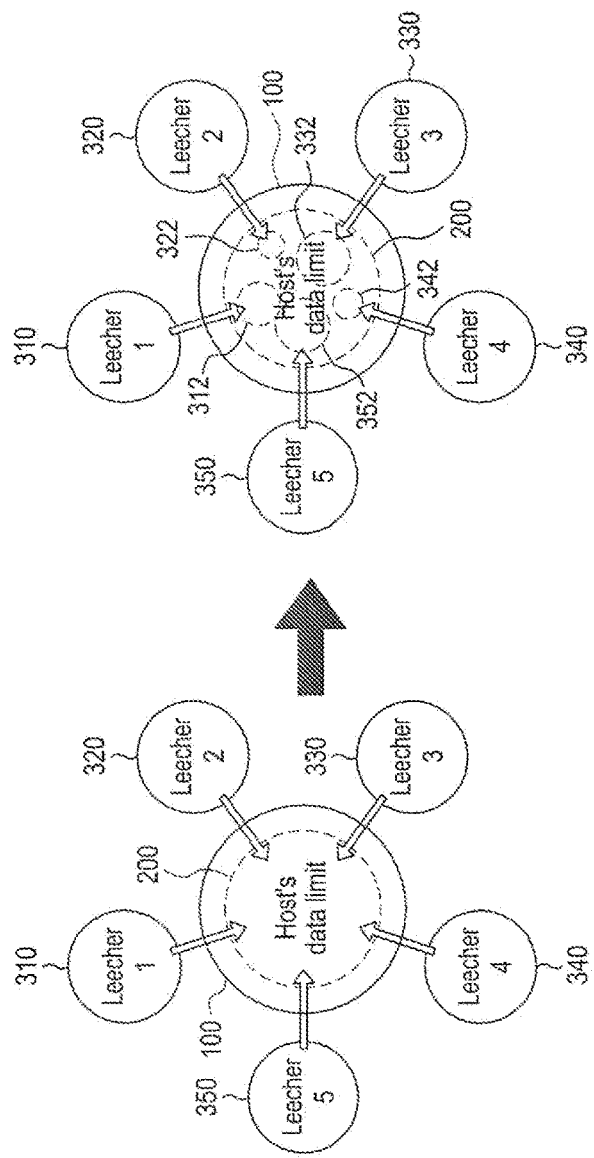
FIGS. 5A and 5B illustrate an operation in which a mobile device is tethered to at least one leecher, according to an embodiment of the present invention.
Figure 6:
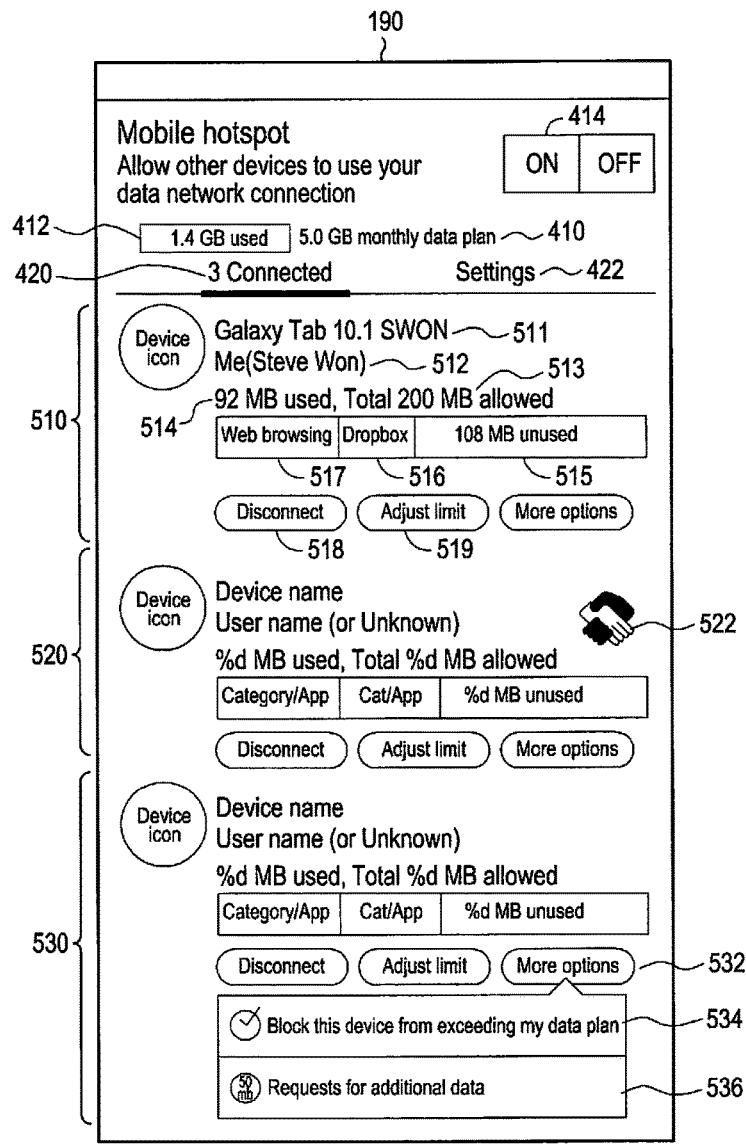
FIGS. 6 and 7 illustrate setting screens for a tethering distribution control method, according to an embodiment of the present invention.
Figure 7:
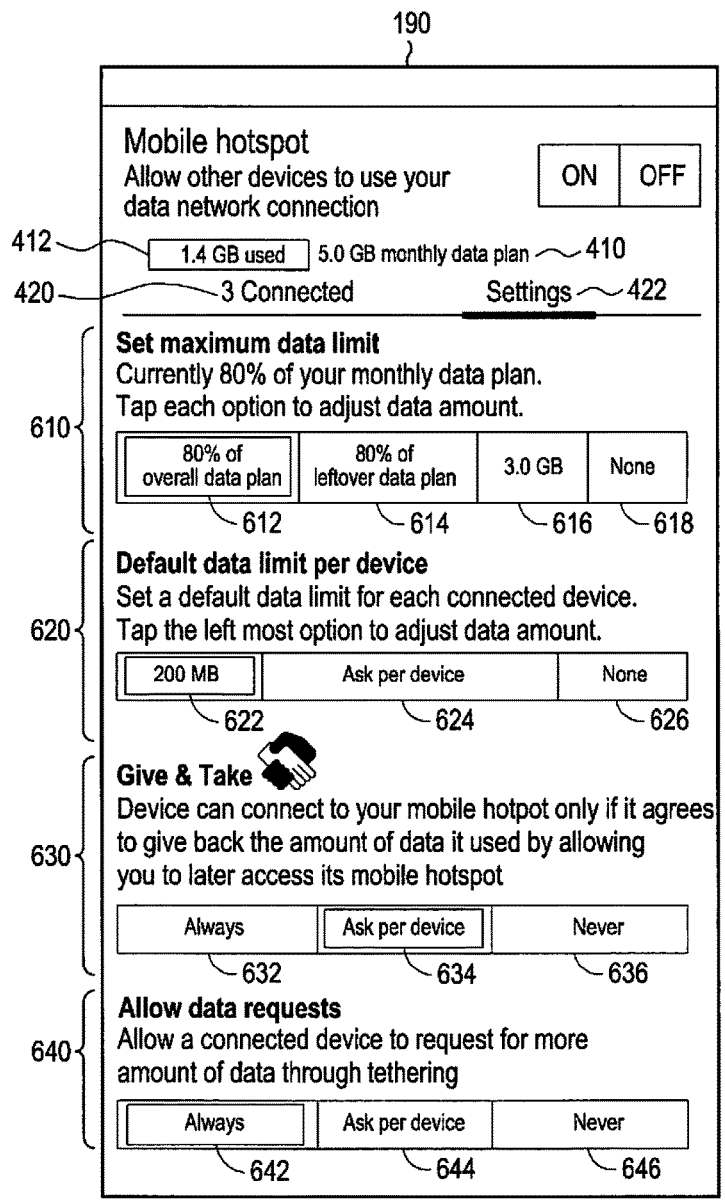

FIG. 4 is a flowchart illustrating a tethering distribution control method, according to an embodiment of the present invention. FIGS. 5A and 5B are diagrams illustrating an operation in which the mobile device 100 is tethered to at least one leecher, according to an embodiment of the present invention. FIGS. 6 and 7 show setting 422 screens for a tethering distribution control method, according to an embodiment of the present invention. As described in herein, the term "leecher" refers to a device that connects to a device of providing tethering to use data.

Referring to FIGS. 1 and 4, in a tethering distribution control method, according to an embodiment of the present invention, at least one leecher to which data is to be tethered is detected, in step 1110. The controller 110 of the mobile device 100 may detect the at least one leecher to which data is to be tethered.

The mobile device 100 may provide a tethering function. The tethering function enables the mobile device 100 to function as a mobile hotspot so that at least one leecher connected to the mobile device 100 can use a network communication service such as, for example, the Internet. The mobile device 100 may be a host device that functions as a mobile hotspot with respect to the at least one leecher. Accordingly, the mobile device 100 functions as a portable WAP to route data to the at least one leecher. For example, the at least one leecher may be an electronic device, such as, for example, a smart phone, a tablet computer, and a laptop computer. Accordingly, the at least one leecher may use a network service such as, for example, the Internet, using the tethering function of the mobile device 100.

The controller 110 of the mobile device 100 may activate tethering with respect to the at least one leecher. For example, as illustrated of FIG. 6, "ON" and "OFF" icons 414 for activating and deactivating tethering may be displayed on the display unit 190. Tethering may be activated when a user inputs a predetermined password. The controller 110 of the mobile device 100 may open or close tethering with respect to each of the at least one leecher.

The controller 110 of the mobile device 100 may detect at least one leecher to which data is to be tethered. Referring to FIG. 5A, the mobile device 100 may detect one or more leechers 310 to 350. Then, the mobile device 100 may connect to the leechers 310 to 350 through communication. Mobile device 100 may have limit of data 200 that is to be tethered to connect all leecher to the mobile device 100. Each leecher may be tethered data by the mobile device 100, and the mobile device 100 may adjust the amounts of tethered data corresponding to the leecher. For example, mobile device 100 may adjust amounts 312 to 352 of data that are to be tethered to correspond to the respective first to fifth leechers 310 to 350, to 700 MB, 200 MB, 1 GB, 500 MB, and 1 GB, respectively.

For example, the mobile device 100 may connect to the leechers 310 to 350 through USB cables, Wi-Fi, or Bluetooth. Accordingly, the controller 110 of the mobile device 100 may detect one or more leechers 310 to 350 to which data is to be tethered through the communication. For example, the controller 110 may detect the first, second, and third leechers 310, 320, and 330. Then, the controller 110 may display information notifying that the three leechers 310, 320, and 330 have been detected on the display unit 190. Also, the controller 110 may display information 510, 520, and 530 about the first, second, and third leechers 310, 320, and 330 on the display unit 190, as illustrated in FIG. 6.

Referring again to FIG. 4, data that is to be tethered to the at least one leecher may be controlled, in step 1120. The controller 110 of the mobile device 100 may control data that is to be tethered to the at least one leecher. Data usage may be controlled by adjusting an amount of data that is to be tethered to correspond to each of the at least one leecher.

For example, the mobile device 100 may set a default data corresponding to the at least one of the leecher 620. That is, the mobile device (100) may adjust leecher 624 or may not adjust leecher 626 of default data that is set at 200 MB 622.

Referring again to FIG. 5B, the controller 110 of the mobile device 100 may control data that is to be tethered to the leechers 310 to 350. Specifically, the controller 110 may control data usage by adjusting an amount of data that is to be tethered to correspond to each of the leechers 310 to 350. For example, as illustrated in FIG. 5B, if the at least one leecher is the first to fifth Leechers 310 to 350, the controller 110 may adjust amounts 312 to 352 of data that are to be tethered to correspond to the respective first to fifth leechers 310 to 350, to 700 MB, 200 MB, 1 GB, 500 MB, and 1 GB, respectively. In this way, in a tethering distribution control method, according to an embodiment of the present invention, an amount of data that is to be tethered to correspond to each of at least one leecher can be controlled.

Controlling data usage may include at least one of detecting an amount of data tethered during at least one session, detecting a use purpose of tethered data, adjusting a maximum data limit that can be tethered to each of at least one leecher, monitoring an amount of data tethered to each of at least one leecher in real time to re-adjust the maximum data limit, stopping tethering with respect to each of at least one leecher, and accepting a request for tethering additional data exceeding the maximum data limit from at least one leecher.

For example, controlling data usage may include detecting an amount of data tethered during at least one session. For example, the controller 110 of the mobile device 100 may detect an amount of data tethered during at least one session to adjust an amount of data that is to be tethered to correspond to each of at least one leecher. The at least one session may be a time period for which tethering starts and then terminates. For example, data of 20 MB may be tethered during a first session for which tethering of a first leecher starts and then terminates. In this case, if 20 MB is more than a predetermined amount of data, the controller 110 may decrease or increase an amount of data that is to be tethered. Accordingly, the controller 110 may detect an amount of data tethered during at least one session, and decrease or increase an amount of data that is to be tethered to correspond to each of at least one leecher in consideration of the detected amount of data. In addition, the controller 110 may display the amount of data tethered during the at least one session on the display unit 190.

For example, as illustrated in FIG. 6, the controller 110 may display an amount of data tethered during at least one session corresponding to a first leecher as "92 MB" 514.

As another example, controlling data usage may include detecting a use purpose of tethered data. The controller 110 of the mobile device 100 may detect a use purpose of tethered data, and adjust an amount of data that is to be tethered to correspond to each of at least one leecher, according to the use purpose of the tethered data. For example, a use purpose of tethered data with respect to a first leecher may be execution of an application, such as web browsing, a cloud backup application, or company E-mail. If importance of web browsing has been set to a low level, the controller 110 may decrease an amount of data that is to be tethered with respect to a first leecher using the web browsing. Meanwhile, if importance of company E-mail has been set to a high level, the controller 110 may increase an amount of data that is to be tethered with respect to a first leecher using company E-mail. As such, the controller 110 may detect a use purpose of tethered data, and decrease or increase an amount of data that is to be tethered to correspond to each of at least one leecher, according to the use purpose of the tethered data. Also, the controller 110 may display the use purpose of the tethered data on the display unit 190. For example, as illustrated in FIG. 6, the controller 110 may display a use purpose of tethered data corresponding to a first leecher as "Web browsing" 517 or "Dropbox" 516.

As another example, controlling data usage may include adjusting a maximum data limit that can be tethered to each of at least one leecher. The controller 110 of the mobile device 100 may adjust a maximum data limit that can be tethered to each of at least one leecher. For example, the controller 110 may increase or decrease a maximum data limit that can be tethered to a first leecher. Also, the controller 110 may display a maximum data limit that can be tethered to a first leecher on the display unit 190. For example, as illustrated in FIG. 6, the controller 110 may display a maximum data limit that can be tethered to correspond to a first leecher, as "200 MB" 513, on the display unit 190. Also, the controller 110 may display an unused amount of data resulting from subtracting the amount of tethered data from the maximum data limit. For example, as illustrated in FIG. 6, the controller 110 may display an unused amount of data of 108 MB 515 resulting from subtracting the amount of tethered data of 92 MB 514 from the maximum data limit of 200 MB 513. In addition, the controller 110 may display an "Adjust limit" icon 519 for adjusting the maximum data limit that can be tethered to each of the at least one leecher.

As another example, controlling data usage may include monitoring an amount of data tethered to each of the at least one leecher in real time to re-adjust the maximum data limit. The controller 110 of the mobile device 100 may monitor an amount of data tethered to each of the at least one leecher in real time to re-adjust the maximum data limit. For example, if an amount of data tethered to a first leecher is monitored to be 92 MB, the controller 110 may re-adjust the maximum data limit from 200 MB to 300 MB. Specifically, the controller 110 may re-adjust the maximum data limit in consideration of an amount of data tethered to each of the at least one leecher and monitored in real time.

As another example, controlling data usage may include stopping tethering with respect to each of the at least one leecher. The controller 110 of the mobile device 100 may stop tethering with respect to each of the at least one leecher. For example, the controller 110 may stop tethering with respect to the first leecher. At this time, the controller 110 may display a "Disconnect" icon 518 for stopping tethering, and when the "Disconnect" icon 518 is selected, the controller 110 may stop tethering with respect to the first leecher.

As another example, controlling data usage may include accepting a request for tethering additional data exceeding the maximum data limit from the at least one leecher. The controller 110 of the mobile device 100 may determine whether a request for tethering additional data exceeding the maximum data limit from the at least one leecher has been accepted, and adjust an amount of data that is to be tethered to correspond to the at least one leecher, according to the result of the determination. For example, if the controller 110 determines that a request for tethering additional data exceeding the maximum data limit from the at least one leecher has been accepted, the controller 110 may increase an amount of data that is tethered to correspond to each of the at least one leecher. Meanwhile, if the controller 110 determines that a request for tethering additional data exceeding the maximum data limit from the at least one leecher has not been accepted, the controller 110 may maintain an amount of data that is to be tethered to correspond to each of the at least one leecher.

Figure 8:
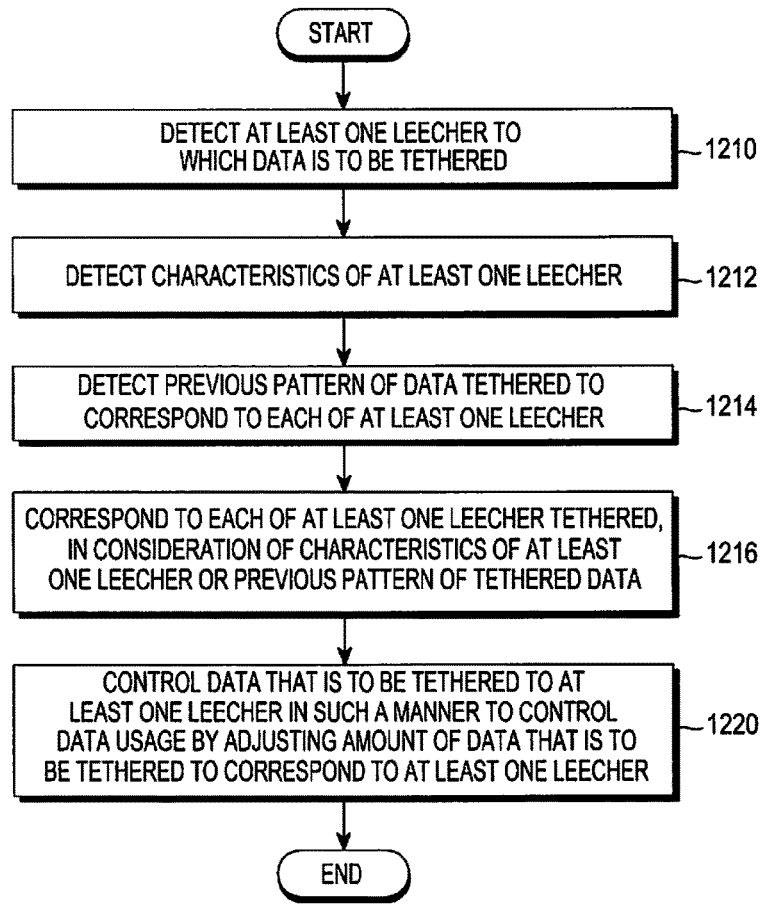
FIG. 8 is a flowchart illustrating a tethering distribution control method, according to another embodiment of the present invention.

FIG. 8 is a flowchart illustrating a tethering distribution control method, according to another embodiment of the present invention. Steps 1210 and 1220 of FIG. 8 are substantially identical to steps 1110 and 1120 of FIG. 4.

Referring to FIGS. 1 and 8, at least one leecher, to which data is to be tethered, may be detected, in step 1210.

Characteristics of the at least one leecher may be detected, in step 1212. The controller 110 may detect characteristic of the at least one leecher. For example, the characteristics of the at least one leecher may include at least one of a device type, user information, and a number of leechers. For example, the controller 110 may detect a tablet PC as the device type, "me" as the user information, and 3 as the number of leechers. Also, the controller 110 may display the characteristics of the at least one leecher on the display unit 190. For example, as illustrated in FIG. 6, the controller 110 may display "Galaxy Tab 10.1 SWON" 511 as the device type, "Me (Steve Won)" 512 as the user information, and "3" 420 as the number of leechers.

Thereafter, a previous pattern of data tethered to correspond to each of the at least one leecher may be detected, in step 1214. The controller 110 may detect a previous pattern of data tethered to correspond to each of the at least one leecher. For example, a previous pattern of tethered data may include a previously used application and data usage corresponding to the application. For example, a previous pattern of tethered data may include a web browsing application and data usage of 50 MB. As such, the controller 110 may detect a previous pattern of data tethered to correspond to each of the at least one leecher.

An amount or kind of data that is to be tethered may be recommended in consideration of characteristics of the at least one leecher or a previous pattern of tethered data, in step 1216. The controller 110 may recommend an amount or kind of data that is to be tethered, in consideration of characteristics of the at least one leecher, or a previous pattern of tethered data.

For example, the controller 110 may recommend an amount or kind of data that is to be tethered, in consideration of characteristics of the at least one leecher. For example, the controller 110 may recommend an amount or kind of data that is to be tethered, in consideration of characteristics of the at least one leecher, such as a device type. If the user information is "me", the controller 110 may recommend a large amount of data. If the user information is an unknown person, the controller 110 may recommend a small amount of data.

As another example, the controller 110 may increase or decrease an amount of data that is to be tethered, based on the number of the at least one leecher. For example, if a first leecher has been connected, the controller 110 may recommend 1 GB to a second leecher, and if the second leecher has been connected, the controller 110 may recommend 750 MB to a third leecher, in correspondence to the number of the at least one leecher. Specifically, the controller 110 may increase or decrease an amount of data that is to be tethered, gradually, in correspondence to the number of connected leechers.

As another example, the controller 110 may recommend an amount or kind of data that is to be tethered, in consideration of a previous pattern of tethered data. Specifically, if a previous pattern of tethered data is data usage of 50 MB for a web browsing application, the controller 110 may recommend an amount or kind of data that is to be tethered, in consideration of the web browsing application and the data usage of 50 MB. For example, the controller 110 may recommend the web browsing application for data usage of 60 MB that is larger than 50 MB, as an amount and kind of data that is to be tethered. As another example, if a previous pattern of tethered data is average data usage of 10 MB per one session for "me", the controller 110 may recommend average data usage of 10 MB for "me".

Data that is to be tethered to the at least one leecher may be controlled according to the recommended amount or kind of data that is to be tethered, in step 1220. The controller 110 of the mobile device 100 may control data that is to be tethered to the at least one leecher, according to the recommended amount or kind of data that is to be tethered. Controlling data that is to be tethered may include controlling data usage by adjusting an amount of data that is to be tethered to correspond to each of the at least one leecher. Accordingly, the controller 110 may control data usage by adjusting an amount of data that is to be tethered to correspond to each of the at least one leecher, according to the recommended amount or kind of data that is to be tethered.

As such, in a tethering distribution control method, according to another embodiment of the present invention, an amount or kind of data that is to be tethered can be recommended in consideration of characteristics of at least one leecher or a previous pattern of tethered data.

Referring again to FIGS. 1 and 4, a tethering distribution control method according to another embodiment of the present invention is described in detail below.

At least one leecher to which data is to be tethered may be detected, in step 1110. The controller 110 of the mobile device 100 may detect at least one leecher to which data is to be tethered.

Data that is to be tethered to the at least one leecher may be controlled, in step 1120. The controller 110 of the mobile device 100 may control data that is to be tethered to the at least one leecher. Controlling the data may include controlling data usage by adjusting an amount of data that is to be tethered to correspond to each of the at least one leecher.

Controlling data usage may include controlling data usage based on a maximum data limit usable according to a data network plan. The data network plan may be a plan about a data amount able to be provided by a communication company connected to the mobile device 100. For example, if a data amount able to be provided by the communication company connected to the mobile device 100 is 5 GB, the controller 110 may display that data amount as "5 GB" 410, as illustrated in FIGS. 6 and 7. Mobile device may display the amount of usage data of 14 GB 412.

Controlling the maximum data limit may include adjusting a ratio of an amount of data that is to be tethered with respect to the maximum data limit. Specifically, the controller 110 may control data usage by adjusting an amount of data that is to be tethered to correspond to each of the at least one leecher, in such a manner as to adjust a ratio of an amount of data that is to be tethered with respect to the maximum data limit. The controller 110 may display a ratio of an amount of data that is to be tethered with respect to the maximum data limit on the display unit 610, as shown by reference numeral 610 of FIG. 7.

The controller 110 may set a ratio of an amount of data that is to be tethered, with respect to the maximum data limit, to 80%. If the maximum data limit is 5 GB, an amount of data that is to be tethered is 4 GB. The controller 110 may display the ratio of 80% as an "80% of overall data plan" icon 612, as illustrated in FIG. 7. Also, the controller 110 may adjust a ratio of an amount of data that is to be tethered with respect to the maximum data limit, using a ratio of a leftover data amount with respect to the maximum data limit (an "80% of leftover data plan" icon 614 of FIG. 7). Also, controlling the maximum data limit may include adjusting an amount of data that is to be tethered to a predetermined amount of data ("3.0 GB" icon 616 of FIG. 7), or not adjusting an amount of data that is to be tethered ("None" icon 618 of FIG. 7).

As another example, controlling the maximum data limit may include allowing tethering of additional data exceeding the maximum data limit. The controller 110 may adjust an amount of data that is to be tethered to correspond to each of the at least one leecher by allowing tethering of additional data exceeding the maximum data limit. Accordingly, if tethering of additional data exceeding the maximum data limit is allowed, the controller 110 may limitlessly allow an amount of data that is to be tethered to correspond to each of the at least one leecher. The controller 110 may receive a request for tethering additional data exceeding the maximum data limit, from the at least one leecher. Then, the controller 110 may display icons for accepting or rejecting the request, as shown in 640 of FIG. 7. The icons may include an "Always" icon 642, an "Ask per device" icon 644, and a "Never" icon 646. If the "Always" icon 642 or the "Ask per device" icon 644 is selected, the controller 110 may allow tethering of additional data exceeding the maximum data limit, using an option item "More options" 532 in FIG. 6. If tethering of additional data exceeding the maximum data limit (536) is disallowed, the controller 110 may limit an amount of data that is to be tethered to correspond to each of the at least one leecher. As illustrated in FIG. 6, if the controller 110 determines that a "Block this device from exceeding may data plan" icon 534 for disallowing tethering of additional data exceeding the maximum data limit has been selected, the controller 110 may disallow tethering of additional data exceeding the maximum data limit.

Therefore, in the tethering distribution control method, according to this other embodiment of the present invention, by adjusting a ratio of an amount of data that is to be tethered with respect to a maximum data limit, or allowing tethering of additional data exceeding the maximum data limit, it is possible to adjust an amount of data that is to be tethered to correspond to the at least one leecher.

Figure 9:
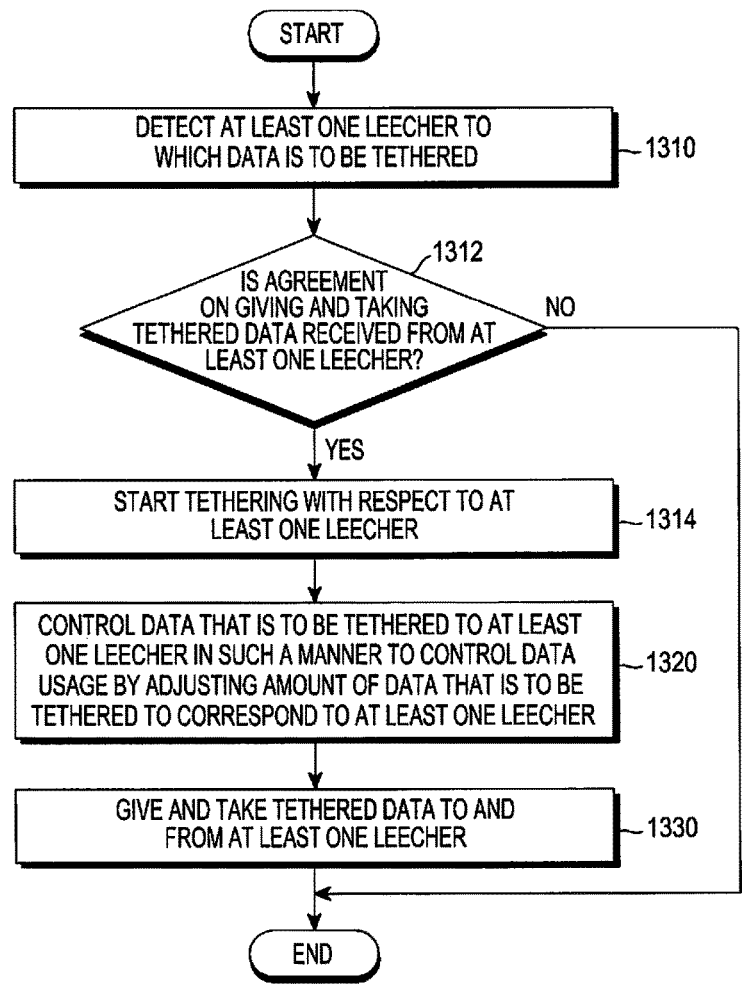
FIG. 9 is a flowchart illustrating a tethering distribution control method, according to another embodiment of the present invention.

FIG. 9 is a flowchart illustrating a tethering distribution control method, according to another embodiment of the present invention. Steps 1310 and 1320 of FIG. 9 are substantially identical to steps 1110 and 1120 of FIG. 4.

Referring to FIGS. 1 and 9, at least one leecher to which data is to be tethered may be detected, in step 1310. The controller 110 of the mobile device 100 may detect at least one leecher to which data is to be tethered.

It is determined whether an agreement on giving and taking the tethered data is received from at least one leecher, in step 1312. The controller 110 may receive an agreement on giving and taking the tethered data from the at least one leecher. The agreement on giving and taking the tethered data may include an expiration period.

As another example, a central mediator may receive an agreement on giving and taking tethered data from the at least one leecher. The central mediator may be a server having accounts of the mobile device 100 and the at least one leecher. The central mediator may recognize an amount and kind of data that is tethered between the mobile device 100 and the at least one leecher.

The controller 110 may display an "Always" icon 632 for always allowing a function of giving and taking tethered data, an "Ask per device" icon 634 for asking each leecher about whether to allow the function of giving and taking tethered data, and a "Never" icon 636 for disallowing the function of giving and taking tethered data, as illustrated in 630 of FIG. 7, and enable a user to select one of the "Always", "Ask per device" and "Never" icons 632, 634, and 636.

Figures 10A, 10B, 10C:
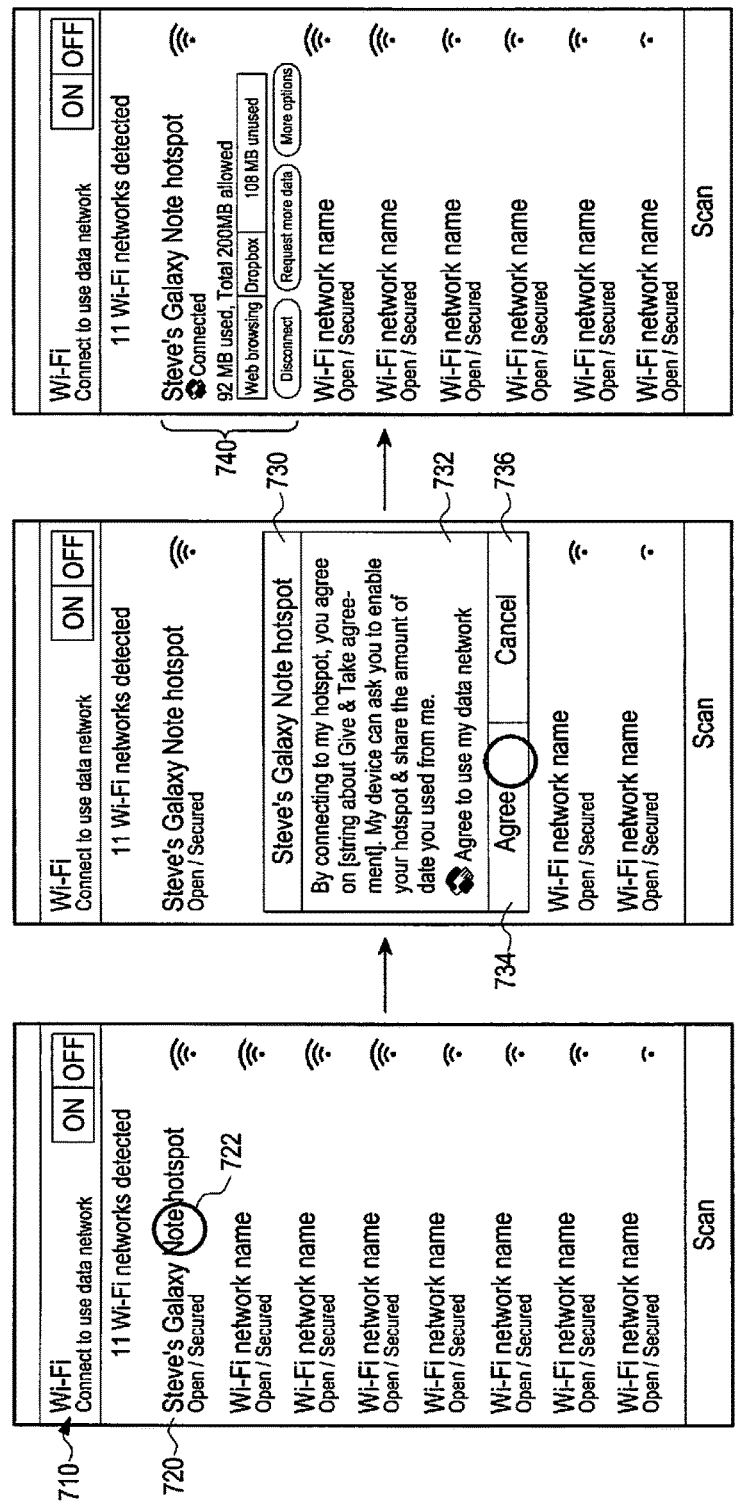
FIGS. 10A-10C illustrate screens on which the tethering distribution control method is executed, according to an embodiment of the present invention.

FIGS. 10A, 10B, and 10C show screens on which the tethering distribution control method, according to an embodiment of the present invention, is executed. Referring to FIGS. 1 and 10A, at least one leecher may detect a mobile hotspot "Steve's Galaxy Note" 720, and display the mobile hotspot "Steve's Galaxy Note" 720 on the display unit 190. For example the mobile device may be connected to the at least one of the leecher by WI-FI 710.

Thereafter, if the at least one leecher determines that the mobile hotspot "Steve's Galaxy Note" 720 has been selected 722, the at least one leecher may display a notice message 730 including an "Agree" icon 734 and a "Cancel" icon 736 to ask about whether to agree 732 on giving and taking tethered data, text 732 that may be indicated the notice message as illustrated in FIG. 10B. If the "Agree" icon 734 is selected, the at least one leecher may transmit an agree message to a mobile device corresponding to the mobile hotspot "Steve's Galaxy Note" 720. A controller (e.g., the controller 110 of FIG. 1) of a mobile device (e.g., the mobile device 100 of FIG. 1) corresponding to the mobile hotspot "Steve's Galaxy Note" 720 may receive an agreement on giving and taking tethered data from the at least one leecher. If no agreement on giving and taking tethering data is received or if a cancel message is received, the process terminates.

Referring back to FIG. 9, if an agreement on giving and taking tethering data is not received, the methodology terminates. If an agreement on giving and taking tethering data is received, tethering with respect to the at least one leecher may be performed, in step 1314. The at least one leecher may display information notifying that tethering has starts on a display unit, as illustrated in 740 of FIG. 10C. The controller 110 of the mobile device 100 may display an icon 522 representing an agreement corresponding to the at least one leecher, as illustrated in FIG. 6.

Data that is to be tethered to the at least one leecher may be controlled, in step 1320. The controller 110 of the mobile device 100 may control data that is to be tethered to the at least one leecher. Controlling the data may include controlling data usage by adjusting an amount of data that is to be tethered to correspond to the at least one leecher.

Tethered data may be given and taken to and from the at least one leecher, in step 1330. The controller 110 of the mobile device 100 may give and take tethered data to and from the at least one leecher. For example, if an amount of data which the mobile device 100 has tethered to the at least one leecher is 2 GB, the controller 110 of the mobile device 100 may give and take the tethered data of 2 GB to and from the at least one leecher. At this time, the controller 110 of the mobile device 100 may send a request 810 for giving and taking the tethered data to the at least one leecher.

Figures 11A, 11B:
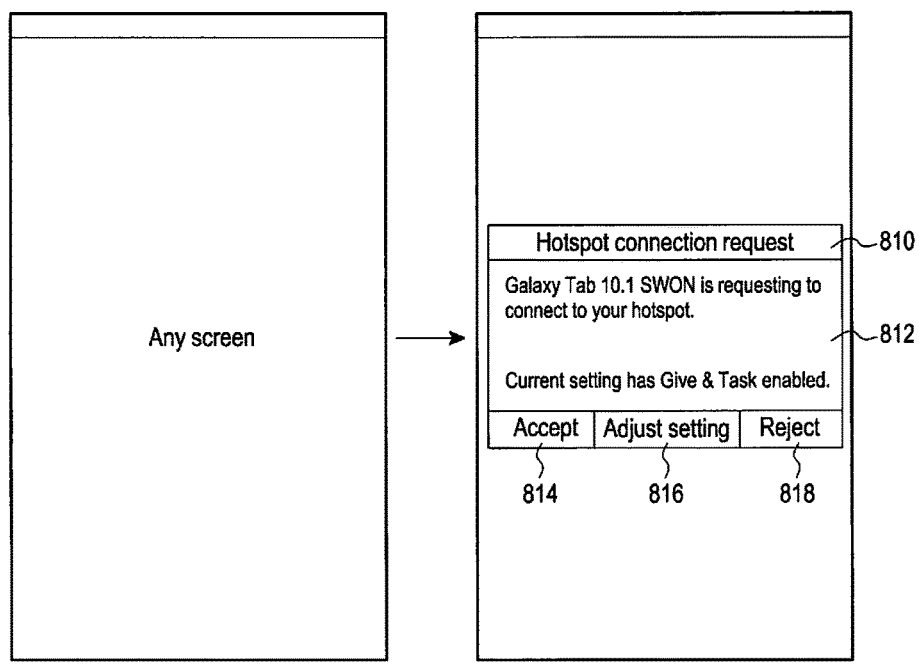
FIGS. 11A and 11B illustrate screens on which the tethering distribution control method is executed, according to another embodiment of the present invention.

FIGS. 11A and 11B shows screens on which the tethering distribution control method is executed, according to the another embodiment of the present invention. The at least one leecher, which has received a request 810 for giving and taking the tethered data may display the request 810 and text 812 that indicated the request 810 on a display unit, as illustrated in FIG. 11B. The at least one leecher may display an "Accept" icon 814, an "Adjust setting" icon 816, and a "Reject" icon 818 for responding to the request 810, on the display unit. If the "Accept" icon 814 is selected, the mobile device 100 may give and take the tethered data to and from the at least one leecher.

As another example, a central mediator may receive a request for giving and taking tethered data to and from the at least one leecher, from the mobile device 100, and transfer the request to the at least one leecher. The central mediator may recognize data tethered to the at least one leecher from the mobile device 100, and take the overall control of giving and taking the tethered data.

Therefore, in the tethering distribution control method, according to an embodiment of the present invention, tethered data can be given and taken to and from at least one leecher.

Hereinafter, a tethering distribution control method, according to another embodiment of the present invention, is described with reference to FIG. 4.

Referring again to FIGS. 1 and 4, at least one leecher to which data is to be tethered may be detected, in step 1110. The controller 110 of the mobile device 100 may detect at least one leecher to which data is to be tethered.

Data that is to be tethered to the at least one leecher may be controlled, in step 1120. The controller 110 of the mobile device 100 may control data that is to be tethered to the at least one leecher. The controlling of the data may include controlling data usage by adjusting an amount of data that is to be tethered to correspond to the at least one leecher.

Controlling data usage may include controlling data usage based on priority according to at least one of a use purpose of tethered data, user information, whether a currently used application is a downloaded application, whether to agree on giving and taking tethered data, and communication quality. The priority may have been decided in advance by a user.

For example, the priority may be decided according to a use purpose of tethered data. The use purpose of tethered data may be video streams, music streams, web browsing, personal E-mail, or company E-mail. The priority may be decided according to such a use purpose of tethered data. Use purposes of tethered data may be grouped into one or more categories. The controller 110 may decide priority according to a use purpose of tethered data, and adjust an amount of data that is to be tethered to correspond to each of the at least one leecher, according to the priority. For example, if company E-mail has been decided to have highest priority, the controller 110 may assign a more amount of data to company E-mail than to video streams.

As another example, the priority may be decided according to user information.

If the user information is "me", the controller 110 may increase an amount of tethered data corresponding to at least one leecher of "me".

As another example, the priority may be decided according to whether a currently used application is a downloaded application. The controller 110 may assign a lower priority to downloaded applications, and a higher priority to native applications. Accordingly, the controller 110 may decrease an amount of data that is to be tethered to correspond to a downloaded application, and increase an amount of data that is to be tethered to correspond to a native application.

As another example, the priority may be decided according to whether an agreement has been made on giving and taking tethered data. If an agreement on giving and taking tethered data is received, as described above with reference to FIG. 9, the controller 110 may increase priority. Accordingly, the controller 110 may increase an amount of data that is to be tethered to correspond to the least one leecher from which the agreement on giving and taking tethered data has been received.

As another example, the priority may be decided according to connection status. The connection status may be between the mobile device 100 and at least one leecher. If a connection status between the at least one leecher and the mobile device 100 is in a good condition, the controller 110 may increase priority. Accordingly, the controller 110 may increase an amount of data that is to be tethered to correspond to at least one leecher that is in a good connection status with the mobile device.

Accordingly, in the tethering distribution control method it is possible to adjust an amount of data that is to be tethered to correspond to at least one leecher according to a priority.

Therefore, as described above, according to a tethering distribution control method of an embodiment of the present invention, it is possible to adjust an amount of data that is to be tethered to correspond to each of at least one leecher.

According to a tethering distribution control method of another embodiment of the present invention, it is possible to recommend an amount or kind of data that is to be tethered, in consideration of characteristics of at least one leecher or a previous pattern of tethered data.

According to a tethering distribution control method of another embodiment of the present invention, it is possible to give and take tethered data to and from at least one leecher.

It will be appreciated that embodiments of the present invention can be realized in the form of hardware, software, or a combination of hardware and software. Any such software may be stored in volatile or non-volatile storage such as, for example, a storage device like a ROM, whether erasable or rewritable or not, in memory such as, for example, RAM, memory chips, device or integrated circuits, or in an optically or magnetically writable, machine (e.g., a computer)-readable medium such as, for example, a CD, DVD, magnetic disk or magnetic tape or the like. It will be appreciated that embodiments of the present invention can be implemented as a computer or a mobile terminal including a controller and a memory. The memory is an example of a machine-readable storage medium suitable to store a program or programs including instructions for implementing embodiments of the present invention. Accordingly, embodiments of the present invention include a program including code for implementing an apparatus or a method and a machine-readable storage storing such a program. Still further, such programs may be conveyed electronically via any medium such as a communication signal carried over a wired or wireless connection and embodiments suitably encompass the same.

The mobile device may receive and store the program from a program providing apparatus connected to the mobile device in a wired or wireless fashion. The program providing apparatus may store programs including instructions for performing embodiments of the present invention, and include a memory for storing information needed to perform embodiments of the present invention, a communication unit to perform a wired or wireless communication with the mobile device, and a controller to transmit a program to a transceiver according to a request from the mobile device or automatically.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for controlling tethering distribution, the method comprising the steps of:
    detecting a plurality of electronic devices to which data is to be tethered;
    displaying a list of the detected plurality of electronic devices;
    displaying a setting screen for setting an amount of data that is to be tethered to the plurality of electronic devices;
    in response to a user input through the setting screen, setting a maximum amount of data that may be tethered to the plurality of electronic devices;
    controlling usage of the data that is to be tethered to the plurality of electronic devices based at least in part on the set maximum amount of data for the plurality of electronic devices, and based on priority according to at least one of a use purpose of tethered data and user information,
    determining an amount of data tethered to the plurality of electronic devices;
    stopping tethering with respect to the plurality of electronic devices when the amount of data tethered to the plurality of electronic devices corresponds to the set maximum amount of data that is capable of being tethered to the plurality of electronic devices.

2. The method of claim 1, further comprising at least one of: detecting an amount of data tethered during at least one session;
    detecting a use purpose of the tethered data;
    adjusting a maximum data limit that is able to be tethered to each of the plurality of electronic devices;
    monitoring an amount of data tethered to each of the plurality of electronic devices in real time to re-adjust the maximum data limit;
    stopping tethering with respect to each of the plurality of electronic devices; and
    accepting a request for tethering additional data exceeding the maximum data limit from the plurality of electronic devices.

3. The method of claim 1, further comprising: detecting characteristics of each of the plurality of electronic devices;
    detecting a previous pattern of data tethered for each of the plurality of electronic devices; and
    recommending an amount or kind of data that is to be tethered based on the characteristics of each of the plurality of electronic devices or the previous pattern of the tethered data,
    wherein the characteristics of each of the plurality of electronic devices comprise at least one of a device type, user information, and a number of electronic devices.

4. The method of claim 1, further comprising adjusting the usage of the data based on a maximum data limit usable according to a data network plan.

5. The method of claim 4, wherein adjusting the usage of the data based on the maximum data limit comprises adjusting a ratio of an amount of data that is to be tethered with respect to the maximum data limit, or allowing tethering of additional data exceeding the maximum data limit.

6. The method of claim 1, further comprising giving and taking tethered data to and from the plurality of electronic devices.

7. The method of claim 6, further comprising:
    receiving an agreement on giving and taking the tethered data, from at least one of the plurality of electronic devices; and
    starting tethering for the plurality of electronic devices, when the agreement on giving and taking the tethered data is received.

8. The method of claim 1, wherein the usage of the data is further controlled based on priority according to at least one of whether a currently used application is a downloaded application, whether an agreement on giving and taking tethered data is received, and connection quality.

9. The method of claim 1, wherein controlling the usage of the data comprises:
    detecting an amount of data tethered to a first electronic device of the plurality of electronic devices during at least one session; and
    decreasing an amount of data that is to be tethered to the first electronic device when the detected amount of data is greater than a predetermined amount of data corresponding to the first electronic device.

10. An electronic device for tethering distribution control, the electronic device comprising:
    a controller configured to:
    detect a plurality of electronic devices to which data is to be tethered,
    control a display to display a setting screen for setting an amount of data that is to be tethered to the plurality of electronic devices,
    in response to a user input through the setting screen, set a maximum amount of data that may be tethered to the plurality of electronic devices,
    control usage of the data that is to be tethered to the plurality of electronic devices based at least in part on the set maximum amount of data for the plurality of electronic devices, and based on priority according to at least one of a use purpose of tethered data and user information;
    determine an amount of data tethered to the plurality of electronic devices,
    control to stop tethering with respect to the plurality of electronic devices when the amount of data tethered to the plurality of electronic devices corresponds to the set maximum amount of data that is capable of being tethered to the plurality of electronic devices.

11. The electronic device of claim 10, wherein the controller is further configured to perform at least one of:
   detecting an amount of data tethered during at least one session; detecting a use purpose of the tethered data;
   adjusting a maximum data limit that is able to be tethered to each of the plurality of electronic devices;
   monitoring an amount of data tethered to each of the plurality of electronic devices in real time to re-adjust the maximum data limit;
   stopping tethering with respect to each of the plurality of electronic devices; and
   accepting a request for tethering additional data exceeding the maximum tethering limit from the plurality of electronic devices.

12. The electronic device of claim 10, wherein the controller is further configured to:
   detect characteristics of each of the plurality of electronic devices,
   detect a previous pattern of data tethered for each of the plurality of electronic devices, and
   recommend an amount or kind of data that is to be tethered based on the characteristics of the plurality of electronic devices or the previous pattern of the tethered data, and
   wherein the characteristics of the plurality of electronic devices comprise at least one of a device type, user information, and a number of electronic devices.

13. The electronic device of claim 10, wherein the controller is further configured to adjust the usage of the data based on a maximum data limit usable according to a data network plan.

14. The electronic device of claim 13, wherein when adjusting the usage of the data based on the maximum data limit, the controller is further configured to adjust a ratio of an amount of data that is to be tethered with respect to the maximum data limit, or allow tethering of additional data exceeding the maximum data limit.

15. The electronic device of claim 10, wherein the controller is further configured to give and take tethered data to and from the plurality of electronic devices.

16. The electronic device of claim 15, wherein the controller is further configured to:
   receive an agreement on giving and taking the tethered data, from at least one the plurality of electronic devices, and
   start tethering with respect to the plurality of electronic devices when the agreement is received.

17. The electronic device of claim 10, wherein the controller is further configured to control the usage of the data based on priority according to at least one of whether a currently used application is a downloaded application, whether an agreement on giving and taking tethered data is received, and connection quality.

* * * * *